(12) United States Patent
Mason et al.

(10) Patent No.: US 8,190,696 B2
(45) Date of Patent: May 29, 2012

(54) DISTRIBUTED NAME SERVICES IN A FIBRE CHANNEL FABRIC

(75) Inventors: Seth Mason, San Jose, CA (US); Venkatasubramanian Kirishnamurthyi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1563 days.

(21) Appl. No.: 11/025,523

(22) Filed: Dec. 28, 2004

(65) Prior Publication Data

US 2006/0143305 A1 Jun. 29, 2006

(51) Int. Cl.
*G06F 15/16* (2006.01)
(52) U.S. Cl. ......................... 709/208; 709/210
(58) Field of Classification Search .................. 709/208, 709/210
See application file for complete search history.

(56) References Cited

U.S. PATENT DOCUMENTS

| | | | |
|---|---|---|---|
| 6,839,746 B1 * | 1/2005 | Muthiyan et al. | 709/220 |
| 7,401,338 B1 * | 7/2008 | Bowen et al. | 719/328 |
| 7,424,533 B1 * | 9/2008 | Di Benedetto et al. | 709/226 |
| 7,904,599 B1 * | 3/2011 | Bennett | 709/249 |
| 2001/0020254 A1 * | 9/2001 | Blumenau et al. | 709/229 |
| 2003/0088658 A1 * | 5/2003 | Davies et al. | 709/223 |
| 2003/0195956 A1 * | 10/2003 | Bramhall et al. | 709/223 |
| 2003/0218986 A1 * | 11/2003 | DeSanti et al. | 370/250 |
| 2004/0022199 A1 * | 2/2004 | Hammons et al. | 370/254 |
| 2004/0177287 A1 * | 9/2004 | Azuma | 714/7 |
| 2004/0181510 A1 * | 9/2004 | Jardin | 707/2 |
| 2006/0072587 A1 * | 4/2006 | Ramaswamy et al. | 370/396 |
| 2006/0117112 A1 * | 6/2006 | Lin et al. | 709/238 |
| 2008/0320143 A1 * | 12/2008 | Di Benedetto et al. | 709/226 |
| 2011/0216778 A1 * | 9/2011 | Chung et al. | 370/401 |

OTHER PUBLICATIONS

Jila Sharghi and Mike Moffet; Simplified Zone Management with EMC VisualSAN.*
Jila Sharghi and Mike Moffet; Simplified Zone Management with EMC VisualSAN; May 2003.*
Wilson, Steven, "Managing a Fibre Channel Storage Area Network—Storage Network Management Working Group for Fibre Channel (SNMWG-FC)", SNIA—Storage Networking Industry Association, Nov. 20, 1998, pp. 1-12.

* cited by examiner

*Primary Examiner* — Brian P Whipple
(74) *Attorney, Agent, or Firm* — Weaver Austin Villeneuve and Sampson LLP

(57) ABSTRACT

Methods and apparatus are provided for improving name services in a fiber channel fabric. Either a world wide name or an alias can be used to uniquely identify a device such as a storage device on a fiber channel fabric. World wide name and alias associations are maintained in an alias database that is synchronized on connected fiber channel switches in a physical fiber channel fabric. Devices can be moved from one switch to another while maintaining alias and world wide name associations.

30 Claims, 6 Drawing Sheets

| | Alias Database 311 | | | |
|---|---|---|---|---|
| | PWWN 401 | FCID 303 | VSAN 305 | ALIAS 307 |
| 321 | 10:00:00:00:c9:32:8b:a8 | 0x670000 | VSAN_8 | SUN1A-LPFC0 |
| 323 | 10:00:00:00:c9:32:8b:a9 | 0x670001 | VSAN_8 | SUN1A-LPFC1 |
| 325 | 50:06:0e:80:03:4e:95:13 | 0xef0000 | VSAN_8 | CPQ-HSG80-1 |
| 327 | 50:00:1f:e1:00:10:3d:f1 | 0xef0004 | VSAN_8 | --- |
| 329 | 50:00:1f:e1:00:10:3d:f2 | 0xef0005 | VSAN_8 | STKL700-1-DRV8 |
| 331 | 20:03:0f:00:cd:31:82:ae | 0x670001 | VSAN_7 | IBMESS-385912-16B |

Figure 3

Alias Database 311

| PWWN 401 | FCID 303 | VSAN 305 | ALIAS 307 |
|---|---|---|---|
| 10:00:00:00:c9:32:8b:a8 | 0x670000 | VSAN_8 | SUN1A-LPFC0 |
| 10:00:00:00:c9:32:8b:a9 | 0x670001 | VSAN_8 | SUN1A-LPFC1 |
| 50:06:0e:80:03:4e:95:13 | 0xef0000 | VSAN_8 | CPQ-HSG80-1 |
| 50:00:1f:e1:00:10:3d:f1 | 0xef0004 | VSAN_8 | --- |
| 50:00:1f:e1:00:10:3d:f2 | 0xef0005 | VSAN_8 | STKL700-1-DRV8 |
| 20:03:0f:00:cd:31:82:ae | 0x670001 | VSAN_7 | IBMESS-385912-16B |

321, 323, 325, 327, 329, 331

DISTRIBUTED NAME SERVICES IN A FIBRE CHANNEL FABRIC

BACKGROUND OF THE INVENTION

1. Field of the Invention

The present invention generally relates to storage area networks. More specifically, the present invention provides mechanisms for efficiently and effectively providing names services in a fibre channel fabric.

2. Description of Related Art

In many storage area networks (SANs), devices are identified using port world wide names (pwwns or wwns). Devices include host bus adapters, tape devices, and disk arrays. A storage area network can have thousands of end devices and thousands of corresponding world wide names. World wide names have formats such as 22:35:00:0c:85:e9:d2:c2 or 13:d3:33:d1:0c:93:e9:d2 that are not easily interpreted by system administrators. Management of a storage area network and its associated devices can become difficult.

Some naming mechanisms are provided for zoning. Zoning allows the partition of a fibre channel fabric into smaller fabrics to allow the implementation of features such as security and restrictions. Devices belonging to a single functional group are typically placed under the same zone. For example, devices involved in online transactions could be placed in one zone while devices associated with backing up user data can be placed in another zone.

The T11 standard FC-SW-3 defines an object called a Zone Alias Object that allows a user to define a plain text name to represent a particular device. However, these mechanisms are very limited and are restricted to the process of zoning. Consequently, it is desirable to provide methods and apparatus for improved names services in a fibre channel fabric that overcome some of the drawbacks noted above.

SUMMARY OF THE INVENTION

Methods and apparatus are provided for improving name services in a fibre channel fabric. Either a world wide name or an alias can be used to uniquely identify a device such as a storage device in a fibre channel fabric. World wide name and alias associations are maintained in an alias database that is synchronized on connected fibre channel switches in a physical fibre channel fabric. Devices can be moved from one switch to another while maintaining alias and world wide name associations.

In one embodiment, a method for managing alias information associated with fibre channel end devices is provided. A world wide name associated with a fibre channel end device is received at a fibre channel switch in a fibre channel fabric. An alias associated with the fibre channel end device is received. A one-to-one correspondence between the world wide name and the alias is created. The one-to-one correspondence between the world wide name and the alias is distributed to other fibre channel switches physically connected in the fibre channel fabric.

In another embodiment, a system for managing alias information associated with fibre channel end devices is provided. The system includes an interface and a processor. The interface is operable to receive a world wide name associated with a fibre channel end device and an alias associated with the fibre channel end device. The processor is operable to create a one-to-one correspondence between the world wide name and the alias and distribute the one-to-one correspondence between the world wide name and the alias to other fibre channel switches physically connected a the fibre channel fabric.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 3 is a diagrammatic representation showing an alias table.

DETAILED DESCRIPTION OF SPECIFIC EMBODIMENTS

Figure 1:
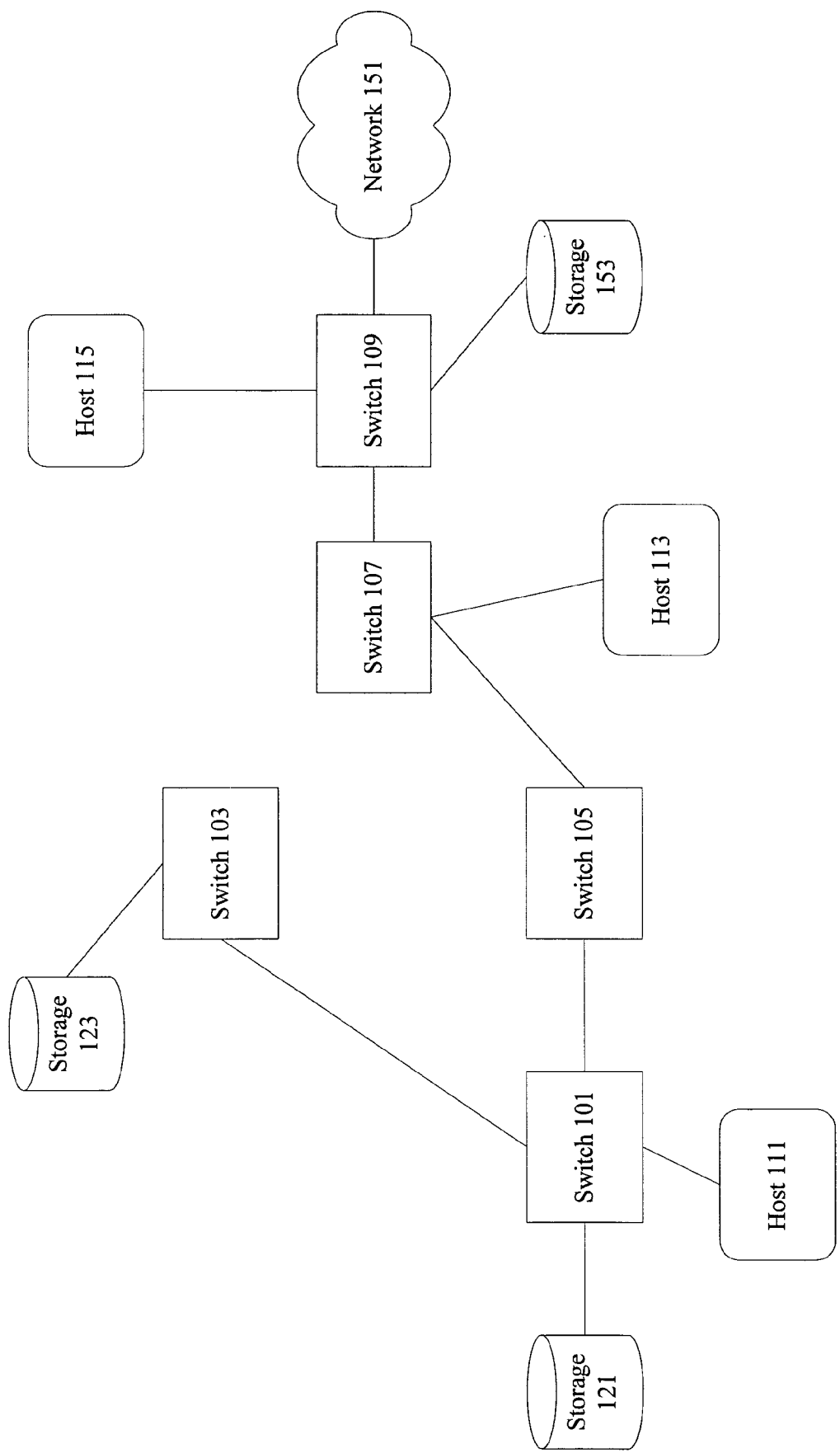
FIG. 1 is a diagrammatic representation showing one example of a fibre channel network that can be used to implement the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Storage area networks identify devices such as tape devices and disk arrays using port world wide names that are often difficult to manage. The port world wide names, such as 22:35:00:0c:85:e9:d2:c2 or 13:d3:33:d1:0c:93:e9:d2 typically have associated fibre channel identifiers (FCIDs). FCIDs are unique within a non-logically segregated physical fabric and are also unique within a logical container in a physical fabric. FCIDs are similarly difficult to manage.

Some naming mechanisms are provided for zoning. Zoning allows the partition of a fibre channel fabric into smaller fabrics to allow the implementation of features such as security and restrictions. Devices belonging to a single functional group, such as backup devices or secure online transaction devices, are typically placed under the same zone. Consequently, aliases can be provided for devices in a particular zone. For example, a zone for backup type devices may include names such as backup_tape_device_A, backup_tape_device_B, disk_array_A, and disk_array_B. Another zone for secure transaction type devices may include names such as vendortapedeviceA, vendortapedeviceB, and disk_array_A. In conventional systems, the same name disk_array_A may be used regardless of whether the name refers to the same physical device.

The aliases for the different zones are typically managed at individual fibre channel switches connected to the devices. For example, one switch may include some alias mappings while another switch may include other alias mappings. Management of devices becomes difficult as manual updates are required if a device is moved to a different switch. No globally unique human readable names are provided for efficient system management.

The techniques of the present invention provide names services that allow a system administrator to manage devices in a fibre channel fabric using both port world wide names and plain-text, human readable names or aliases. A fibre channel switch in the fibre channel fabric allows a user to specify either an alias or a world wide name when referencing a device in the fabric. According to various embodiments, a one-to-one correspondence is maintained. That is, each alias is used to uniquely identify a particular device in the fabric. No two devices share the same alias and no alias is used for multiple devices.

Alias and world wide name associations are propagated and synchronized throughout a fibre channel fabric. Consequently, when a device is moved from one switch to another, the alias will be maintained as long as the switches are interconnected. A system administrator will not need to update the database when devices are moved.

According to various embodiments, alias servers run on each fibre channel fabric switch in a physically connected fibre channel fabric. Each alias server maintains an alias database that maps world wide names to aliases. When alias information is updated in the alias database at a particular fibre channel switch, the alias server at that fibre channel switch acts as the alias master while other alias servers running on other switches act as alias slaves. Changes are made to the alias master and are propagated to the slaves after locking the appropriate resources. When aliases are updated, the alias database is locked to prevent duplicate entries.

Alias slaves can also become alias masters when connected devices need alias updates. According to various embodiments, mechanisms are also provided for merging fibre channel fabrics and merging alias databases. In one embodiment, a union is performed on two separate alias databases and unique entries are integrated into a single database. Conflicting or non-unique entries are flagged to allow for user intervention. This mechanism allows for possible migration from zone based aliases, where aliases were unique in particular zones but may not be unique in a physical fibre channel fabric. Data can also be imported or exported. Updates can also be made when devices are added or removed from a fabric. However, due to the one-to-one mapping between aliases and world wide names, updates are not required when a device is moved from one switch to another switch in the fibre channel fabric.

FIG. 1 is a diagrammatic representation of one example of a network that can use the techniques of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-ports (non F-ports). Non fabric-ports include interswitch ports (E-ports). Ports used to connect a switch to a host are referred to herein as fabric-ports (F-ports). In one example, non F-ports are used to connect switch 105 to switch 107 while F-ports are used to connect switch 107 to host 113. Similarly, fabric loop-ports (FL-ports) are used to connect switch 103 to storage resource 123. Ports such as F-ports and FL-ports are herein, referred to as edge ports. Other ports such as E-ports are referred to as non-edge ports.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets. Fibre channel networks provide mechanisms for minimizing packet drops and providing in order delivery of packets. These mechanisms are not provided in conventional Internet Protocol (IP) networks.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time is referred to herein as a loop. In one example, a loop is a Small Computer Systems Interface (SCSI) loop that allows connection of 8 or 16 devices in a half-duplex framework.

Figure 2:
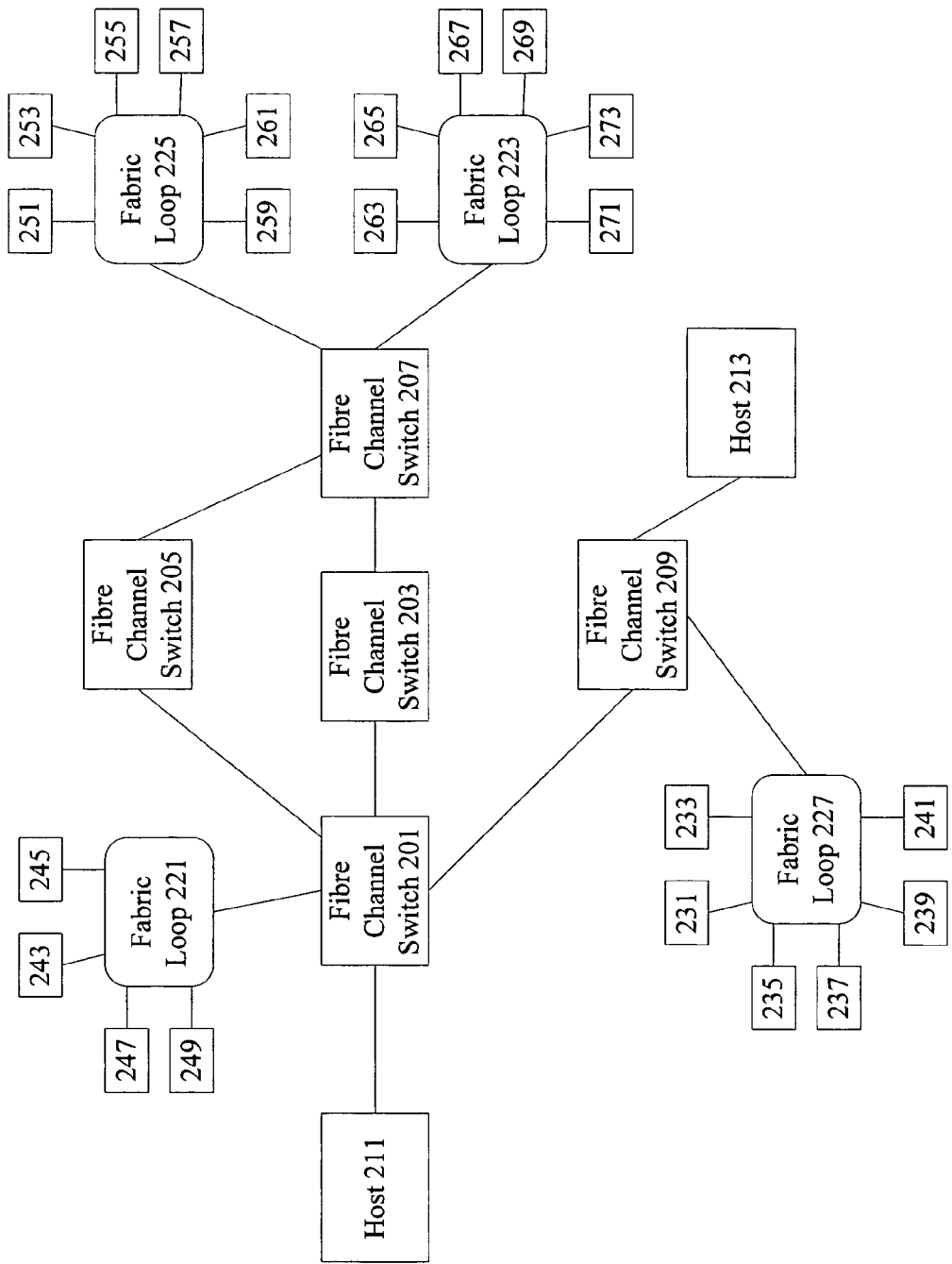
FIG. 2 is a diagrammatic representation showing a fibre channel network having devices in different zones.

FIG. 2 is a diagrammatic representation showing a variety storage devices. A fibre channel network includes fibre channel switches 201, 203, 205, 207, and 209. Switch 201 is coupled to host 211 through an E-port and fabric loop 221 through an FL-port. The fabric loop 211 includes storage devices 243, 245, 247, and 249. Switch 205 is coupled to switches 201 and 207 through F-ports. Switch 203 is coupled to switches 201 and 207 through F-ports. Switch 209 is coupled to host 213 through an E-port and to fabric loop 227 through an FL-port. Fabric loop 227 includes storage devices 231, 233, 235, 237, 239, and 241. Switch 207 is coupled to fabric loops 225 and 223 through FL-ports. Fabric loop 225 includes storage devices 251, 253, 255, 257, 259, and 261. Fabric loop 223 includes storage devices 263, 265, 267, 269, 271, and 273.

According to various embodiments, devices 245, 255, and 271 are included in Zone 1 while devices 233, 257, and 269 are included in Zone 2. Aliases can be provided to the selected devices within the context of zones. For example, devices 245, 255, and 271 may be provided with aliases backup_tape_drive_A, backup_tapedrive_B, and backup_tapedrive_C. The aliases may be mapped to corresponding world wide names and fibre channel identifiers (FC_IDs). In some embodiments, the mappings for devices 255 and 271 are maintained at fibre channel switch 207 while the mapping for device 245 is maintained at fibre channel switch 201. Other switches such as switches 203 and 205 may not have any mapping information.

Devices 233, 257, and 269 may be provided with aliases backup_tapedrive_A, vendor1diskarrayA, and vendor1diskarrayB. The aliases may be mapped to corresponding world wide names and fibre channel identifiers (FC_IDs) at switches 207 and 209.

Although the aliases may be unique within a particular zone, the aliases may not be unique across zones. Aliases are unique with regard to a single switch. A zone is not necessarily a container for alias definitions. However, two switches could have different definitions for the same alias. For example, backup_tapedrive_A may refer to both device 233 and device 245. Furthermore, mapping information is only stored locally at the fibre channel switch connected to a particular device. According to various embodiments, the techniques of the present invention provide aliases that are unique across all physically connected fibre channel switches and maintained throughout a fibre channel fabric.

FIG. 3 is a diagrammatic representation showing one example of an alias database. Any mechanism associating world wide names with aliases for storage devices in a fibre channel network is referred to herein as an alias database. In some instances, the alias database is an alias table having one column holding unique world wide names and another column holding unique aliases. In other examples, the alias database includes additional fields such as fibre channel identifiers (FCIDs), VSAN identifiers, versions, device types, vendor descriptions, etc. A wide variety of fields can be provided for efficiency and convenience purposes.

In one example, the alias database 311 includes fields for port world wide names 301, fibre channel identifiers 303, VSANs 305, and aliases 307. According to various embodiments, entries for port world wide names and aliases are globally unique across VSANs. Entries for fibre channel identifiers 303 are typically unique only for a particular VSAN. For example, entry 323 has an FCID of 0x6700001 in VSAN_8. Entry 331 has the same FCID of 0x670001 in VSAN_7. However, the port world wide names and aliases remain unique.

According to various embodiments, the alias database is mirrored throughout the network in a synchronized and coherence manner. Updates are not allowed without locking so that entries remain consistent. In some instances, the alias database is maintained on all physically connected fibre channel switches in a fibre channel fabric, although other configurations are also possible. For example, some fibre channel switches may not maintain an alias database or may maintain only a partial copy of the alias database. By maintaining alias databases with aliases uniquely mapped to world wide names, devices can be moved from one fibre channel switch to another without affecting system operation. Alias information can be maintained.

The alias database can be accessed using a variety of interfaces including command line interfaces. In one example, aliases are not used and storage devices are accessed using world wide names in the following manner:
172.22.36.8# show fcns database vsan 800
VSAN 800:
FCID TYPE PWWN (VENDOR) FC4-TYPE:FEATURE
0x670000 N 10:00:00:00:c9:32:8b:a8 (Emulex) scsi-fcp
0x670001 N 10:00:00:00:c9:32:8b:a9 (Emulex) scsi-fcp
0xef0000 N 50:06:0e:80:03:4e:95:13 scsi-fcp:target
0xef0004 N 50:00:1f:e1:00:10:3d:f1 scsi-fcp:target
0xef0005 N 50:00:1f:e1:00:10:3d:f2 scsi-fcp:target
Total number of entries=5

However, reviewing the command line interface output does not provide much device information other than the fields listed in "VENDOR" and "FC4-TYPE". According to various embodiments of the present invention, however, more information can be obtained about particular devices using a command line interface in the following manner:
172.22.36.8# show fcns database vsan 800
VSAN 800:
FCID TYPE ALIAS (VENDOR) FC4-TYPE:FEATURE
0x670000 N SUN1A-LPFC0 (Emulex) scsi-fcp
0x670001 N SUN1A-LPFC1 (Emulex) scsi-fcp
0xef0000 N CPQ-HSG80-1 scsi-fcp:target
0xef0004 N IBMESS-385912-16B scsi-fcp:target
0xef0005 N STKL700-1-DRV8 scsi-fcp:target
Total number of entries=5

Using information from the alias field, it can be determined by a system administrator that the fabric includes two Sun based Emulex adapters, a Compaq disk array, an IBM ESS port, and a STK tape drive.

Figure 4:
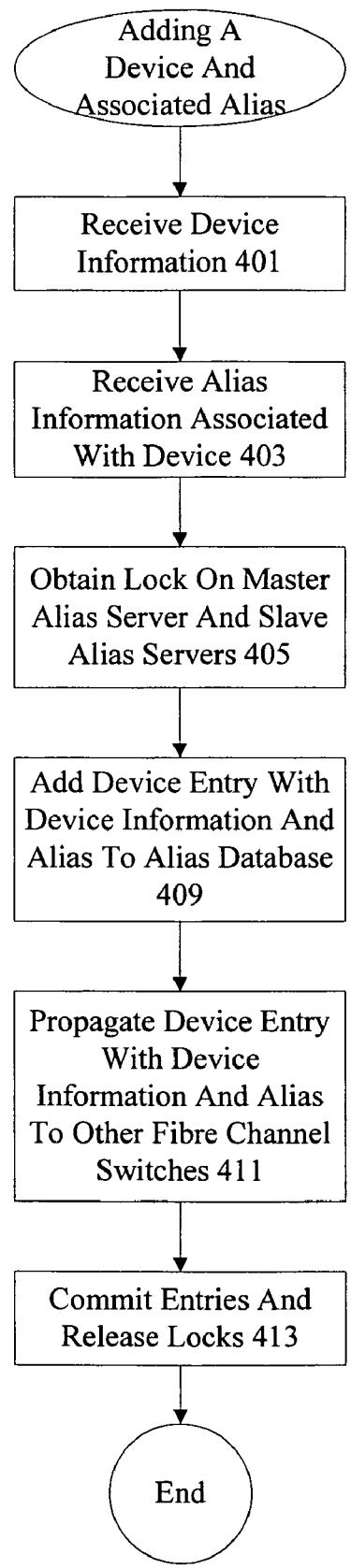
FIG. 4 is a flow process diagram showing a technique for adding a device with a device alias.

FIG. 4 is a flow process diagram showing one technique for adding a device and its associated alias, to a fiber channel fabric. At 401, device information is received at a fiber channel switch. Device information includes information such as port world wide names, the fiber channel identifier, and/or the one or more of VSANs associated with the device. According to various embodiments, an alias master is running at the fiber channel switch receiving the device information. At 403, alias information associated with the device is received.

According to various embodiments, the alias information is human readable text associated with the device. The alias can be used to a uniquely correspond to a particular world wide name. At 405, a lock is obtained on the master alias server in the slave alias servers. In some examples, the switch receiving device information and the alias information is also the master alias server. In other examples, the switch receiving the device information is a slave alias server which enters master alias server status upon obtaining a lock. According to various embodiments, particular tables associated with the master alias servers and the slave alias servers are locked. In other examples, the servers themselves are locked.

At 409, device information and alias information is added to the alias database. At 411, the device entry with device information and alias is propagated to other fiber channel switches. According to various embodiments, the information can be propagated over a fiber channel network or any other network connecting the fiber channel switches. In some instances, the information can be manually propagated or propagated using a fiber channel management service such as Cisco Fabric Services available from Cisco Systems of San Jose, Calif.

Cisco Fabric Services (CFS) provides a common infrastructure for automatic configuration synchronization in the fabric. It provides the transport function as well as a rich set of common services to the applications. CFS has the ability to discover CFS capable switches in the fabric and discover application capabilities in all CFS capable switches. According to various embodiments, CFS provides both uncoordinated distributions where multiple parallel distributions are allowed in the fabric and coordinated distributions where only one distribution is allowed in the fabric at any given time.

Uncoordinated distributions are used to distribute information that is not expected to conflict with that from a peer. An example is local device registrations. Parallel uncoordinated distributions are allowed for an application. Coordinated distributions allow only one distribution at a given time. Coordinated distributions are used to distribute information that can be manipulated and distributed from multiple switches, for example, the port security configuration.

After device information and alias information are distributed to other fiber channel switches, database entries are committed and one or more locks are released at 413.

Figure 5:
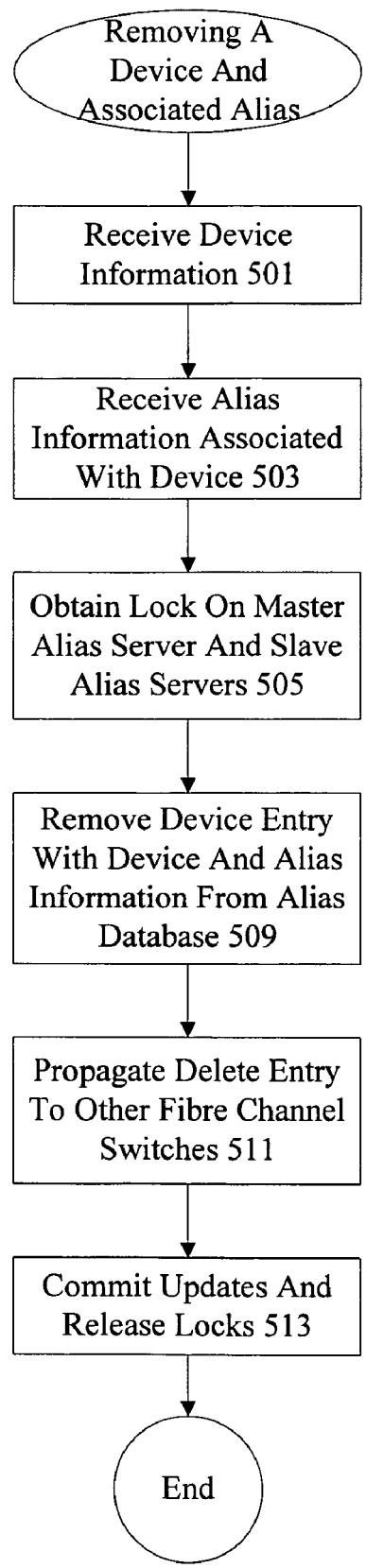
FIG. 5 is a flow process diagram showing a technique for removing a device with a device alias.

FIG. 5 is a flow process diagram showing a technique for removing a device and associated alias. At 501, device information is received. At 503, alias information associated with the device is received. According to various embodiments, there is a one-to-one correspondence between an alias and a particular device world wide name. At 505, a lock is obtained on a master alias server and one or more slave alias servers. At 509, the device entry with device information and alias is removed from the alias database. At 511, the delete of the entry is propagated to other fiber channel switches. According to various embodiments, the delete entry is propagated using mechanisms such as CFS, although a variety of other mechanisms can also be used. At 513, the updated entries are committed and locks are released.

Figure 6:
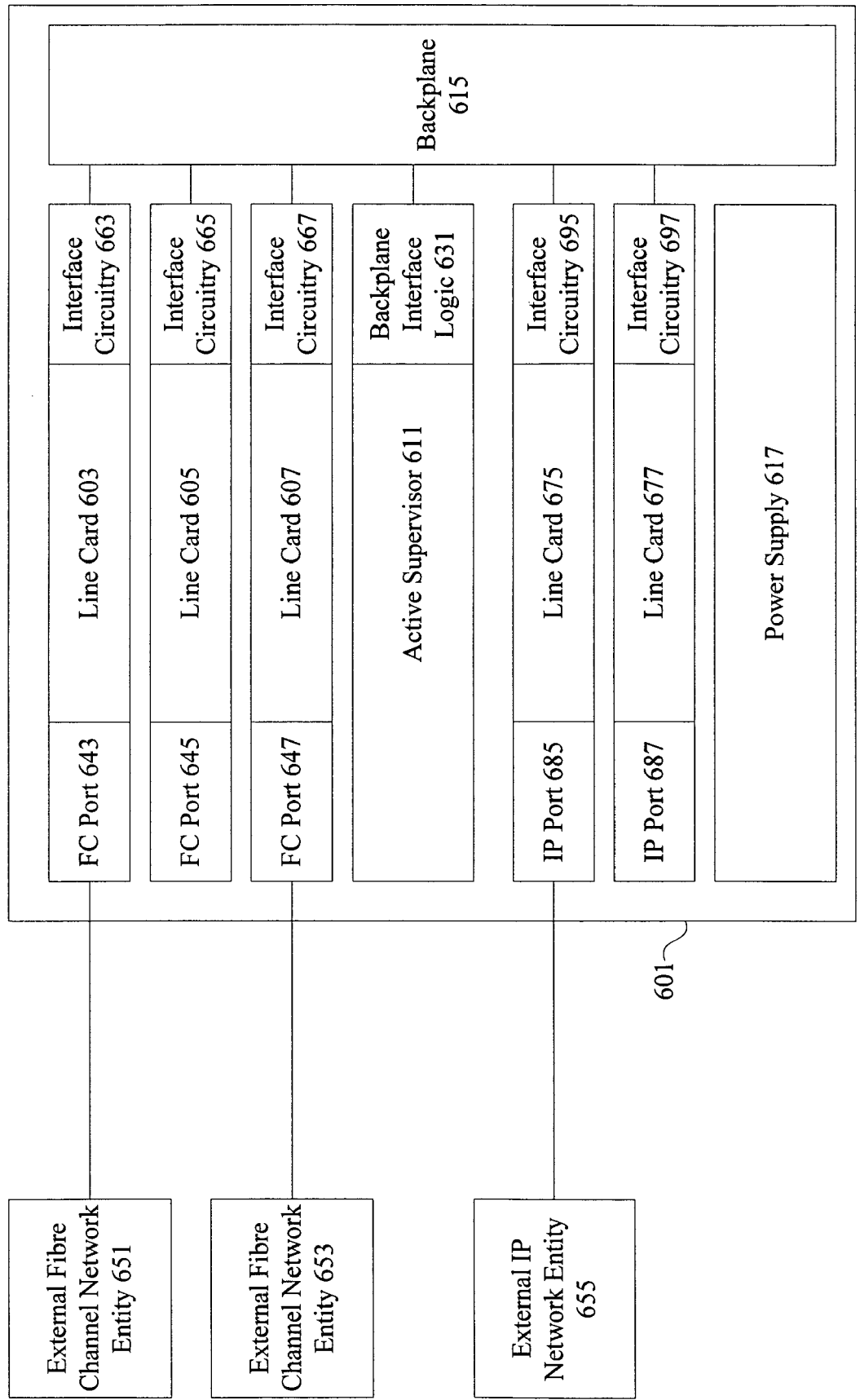
FIG. 6 is a diagrammatic representation depicting a fibre channel switch.

FIG. 6 is a diagrammatic representation of one example of a fibre channel switch that can be used to implement techniques of the present invention. Although one particular configuration will be described, it should be noted that a wide variety of switch and router configurations are available. The tunneling switch 601 may include one or more supervisors 611. According to various embodiments, the supervisor 611 has its own processor, memory, and storage resources.

Line cards 603, 605, and 607 can communicate with an active supervisor 611 through interface circuitry 683, 685, and 687 and the backplane 615. According to various embodiments, each line card includes a plurality of ports that can act as either input ports or output ports for communication with external fibre channel network entities 651 and 653. The backplane 615 can provide a communications channel for all traffic between line cards and supervisors. Individual line cards 603 and 607 can also be coupled to external fibre channel network entities 651 and 653 through fibre channel ports 643 and 647.

External fibre channel network entities 651 and 653 can be nodes such as other fibre channel switches, disks, RAIDS, tape libraries, or servers. The fibre channel switch can also include line cards 675 and 677 with IP ports 685 and 687. In one example, IP port 685 is coupled to an external IP network entity 655. The line cards 675 and 677 also have interfaces 695 and 697 to the backplane 615.

It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for managing alias information associated with fibre channel end devices, the method comprising:
receiving a world wide name associated with a fibre channel end device at a first fibre channel switch in a first fibre channel fabric in a first zone, the first fibre channel switch operating as an alias master;
receiving an alias associated with the fibre channel end device at the first fibre channel switch;
creating a one-to-one correspondence between the world wide name and the alias at the first fibre channel switch;
distributing the one-to-one correspondence between the world wide name and the alias to a plurality of fibre channel switches physically connected to the first fibre channel switch in the first fibre channel fabric, wherein the plurality of fibre channel switches operate as a plurality of alias slaves; and
migrating the fibre channel end device to a second fibre channel switch, wherein the alias is checked for conflicts if the second fibre channel switch resides in a different fibre channel fabric but a conflict check is not needed if the second fibre channel device resides in a different zone in the first fibre channel fabric.

2. The method of claim 1, wherein creating the one-to-one correspondence comprises verifying that no other end devices in the first fibre channel fabric have the same alias.

3. The method of claim 2, wherein creating the one-to-one correspondence further comprises verifying that the end device in the first fibre channel fabric only has a single alias.

4. The method of claim 1, wherein the end device is a disk array.

5. The method of claim 1, wherein the end device is a tape device.

6. The method of claim 1, further comprising adding an entry to an alias database, wherein the alias database includes one-to-one mappings of world wide names and aliases for other devices in the first fibre channel fabric.

7. The method of claim 6, wherein distributing the one-to-one correspondence comprises locking the alias database.

8. The method of claim 7, wherein locking the alias database comprises locking alias databases of all fibre channel switches physically connected in the first fibre channel fabric.

9. The method of claim 7, wherein locking the alias database comprises making the alias database associated with the first fiber channel switch the alias master.

10. The method of claim 9, wherein the alias databases associated with the other fibre channel switches become alias slaves.

11. The method of claim 6, wherein the alias databases for other device include the same information as the alias database at the first fibre channel switch.

12. The method of claim 6, wherein all alias databases have a local copy of the first fibre channel switch alias database.

13. The method of claim 6, wherein the one-to-one correspondence is distributed to all other fibre channel switches physically connected in the first fibre channel fabric.

14. A system for managing alias information associated with fibre channel end devices, the system comprising:
   an interface operable to receive a world wide name associated with a fibre channel end device and an alias associated with the fibre channel end device;
   a processor operable to create a one-to-one correspondence between the world wide name and the alias and distribute the one-to-one correspondence between the world wide name and the alias to other fibre channel switches physically connected in a fibre channel fabric, wherein the alias is checked for conflicts when the fibre channel end device is moved to a second fibre channel end device if the second fibre channel switch resides in a different fibre channel fabric but a conflict check is not needed if the second fibre channel device resides in a different zone in the same fibre channel fabric.

15. The system of claim 14, wherein creating the one-to-one correspondence comprises verifying that no other end devices in the fibre channel fabric have the same alias.

16. The system of claim 15, wherein creating the one-to-one correspondence further comprises verifying that the end device in the fibre channel fabric only has a single alias.

17. The system of claim 14, wherein the end device is a disk array.

18. The system of claim 14, wherein the end device is a tape device.

19. The system of claim 14, further comprising adding an entry to an alias database, wherein the alias database includes one-to-one mappings of world wide names and aliases for other devices in the fibre channel fabric.

20. The system of claim 19, wherein distributing the one-to-one correspondence comprises locking the alias database.

21. The system of claim 20, wherein locking the alias database comprises locking alias databases of all fibre channel switches physically connected in the fibre channel fabric.

22. The system of claim 20, wherein locking the alias database comprises making the alias database associated with the fiber channel switch the alias master.

23. The system of claim 22, wherein the alias databases associated with the other fibre channel switches become alias slaves.

24. The system of claim 19, wherein the alias databases for other device include the same information as the alias database at the fibre channel switch.

25. The system of claim 19, wherein all alias databases have a local copy of the fibre channel switch alias database.

26. The system of claim 19, wherein the one-to-one correspondence is distributed to all other fibre channel switches physically connected in the fibre channel fabric.

27. A fibre channel switch, comprising:
   means for receiving a plurality of world wide names associated with a plurality of fibre channel end devices in a first zone, the first fibre channel switch operating as an alias master;
   means for receiving a plurality of aliases associated with the plurality of fibre channel end devices;
   means for creating one-to-one correspondences between the plurality of world wide names and the plurality of aliases;
   means for distributing the one-to-one correspondences between the plurality of world wide names and the plurality of aliases to other fibre channel switches physically connected to the fibre channel switch in a first fibre channel fabric, wherein the other fibre channel switches operate as alias slaves; and
   means for migrating the fibre channel end device to a second fibre channel switch, wherein an alias for the fibre channel end device is checked for conflicts if the second fibre channel switch resides in a different fibre channel fabric but a conflict check is not needed if the second fibre channel device resides in a different zone in the first fibre channel fabric.

28. The fibre channel switch of claim 27, wherein creating the one-to-one correspondences comprises verifying that no other end devices in the first fibre channel fabric have the same alias.

29. The fibre channel switch of claim 28, wherein creating the one-to-one correspondences further comprises verifying that the end device in the first fibre channel fabric only has a single alias.

30. The fibre channel switch of claim 27, wherein the end device is a disk array.

* * * * *